US010355262B2

(12) United States Patent
Kang et al.

(10) Patent No.: US 10,355,262 B2
(45) Date of Patent: Jul. 16, 2019

(54) ELECTRODE ASSEMBLY AND BATTERY PACK HAVING THE SAME

(71) Applicant: SAMSUNG SDI CO., LTD., Yongin-si, Gyeonggi-do (KR)

(72) Inventors: Seonyeong Kang, Yongin-si (KR); Jangho Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 14/850,644

(22) Filed: Sep. 10, 2015

(65) Prior Publication Data

US 2016/0141589 A1    May 19, 2016

(30) Foreign Application Priority Data

Nov. 19, 2014    (KR) .................. 10-2014-0161669

(51) Int. Cl.
*H01M 2/06*    (2006.01)
*H01M 2/16*    (2006.01)
(Continued)

(52) U.S. Cl.
CPC .............. *H01M 2/26* (2013.01); *H01M 2/06* (2013.01); *H01M 2/1653* (2013.01); *H01M 2/1673* (2013.01); *H01M 2/18* (2013.01); *H01M 2/263* (2013.01); *H01M 2/30* (2013.01); *H01M 2/347* (2013.01); *H01M 4/667* (2013.01); *H01M 10/0431* (2013.01); *H01M 2220/20* (2013.01)

(58) Field of Classification Search
CPC ............ H01M 2/26; H01M 2/30; H01M 2/06; H01M 2/266
See application file for complete search history.

(56) References Cited

U.S. PATENT DOCUMENTS 5,158,842 A * 10/1992 McHenry .............. H01M 2/266
429/161
2007/0154788 A1    7/2007 Hong et al.
(Continued)

FOREIGN PATENT DOCUMENTS

EP      2437330 A1    4/2012
EP      2546905 A1    1/2013
(Continued)

OTHER PUBLICATIONS

Extended European search report and search opinion for EP 15191647.5 dated Mar. 22, 2016 (9 pages).

*Primary Examiner* — Matthew J Merkling
(74) *Attorney, Agent, or Firm* — Lewis Roca Rothgerber Christie LLP

(57) ABSTRACT

The present invention relates to an electrode assembly and a battery pack having the same, which can reinforce strength of an electrode tab by a protection layer formed on at least one surface of each of a plurality of electrode tabs. The electrode assembly includes a first electrode plate having a plurality of first electrode tabs extending and protruding to one side, a second electrode plate having a plurality of second electrode tabs extending and protruding to one side, and a separator interposed between the first electrode plate and the second electrode plate. The first electrode plate may further include a first protection layer formed on one surface of each of the plurality of first electrode tabs.

13 Claims, 7 Drawing Sheets

(51) Int. Cl.
    *H01M 2/18*     (2006.01)
    *H01M 2/26*     (2006.01)
    *H01M 2/30*     (2006.01)
    *H01M 2/34*     (2006.01)
    *H01M 4/66*     (2006.01)
    *H01M 10/04*     (2006.01)

(56) References Cited

U.S. PATENT DOCUMENTS

| | | |
|---|---|---|
| 2011/0293977 A1 | 12/2011 | Kim et al. |
| 2013/0017424 A1* | 1/2013 | Ahn .................... H01M 2/1646 429/94 |
| 2013/0224580 A1* | 8/2013 | Cherng ................. H01M 2/26 429/211 |
| 2014/0335400 A1* | 11/2014 | Cherng ............. H01M 10/0585 429/162 |
| 2015/0125738 A1 | 5/2015 | Hirose |
| 2016/0329547 A1* | 11/2016 | Jin ......................... H01M 2/26 |
| 2017/0092924 A1* | 3/2017 | Wakimoto .............. H01M 2/08 |

FOREIGN PATENT DOCUMENTS

| | | |
|---|---|---|
| KR | 10-20070087857 A | 8/2007 |
| KR | 10-2010-0071941 A | 6/2010 |
| KR | 10-2013-0005441 A | 1/2013 |
| WO | WO 2013/164998 A1 | 11/2013 |

\* cited by examiner

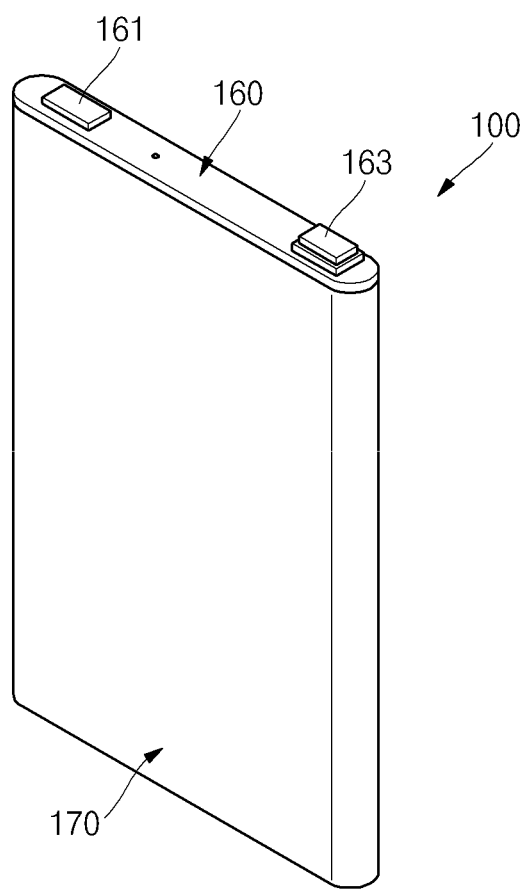

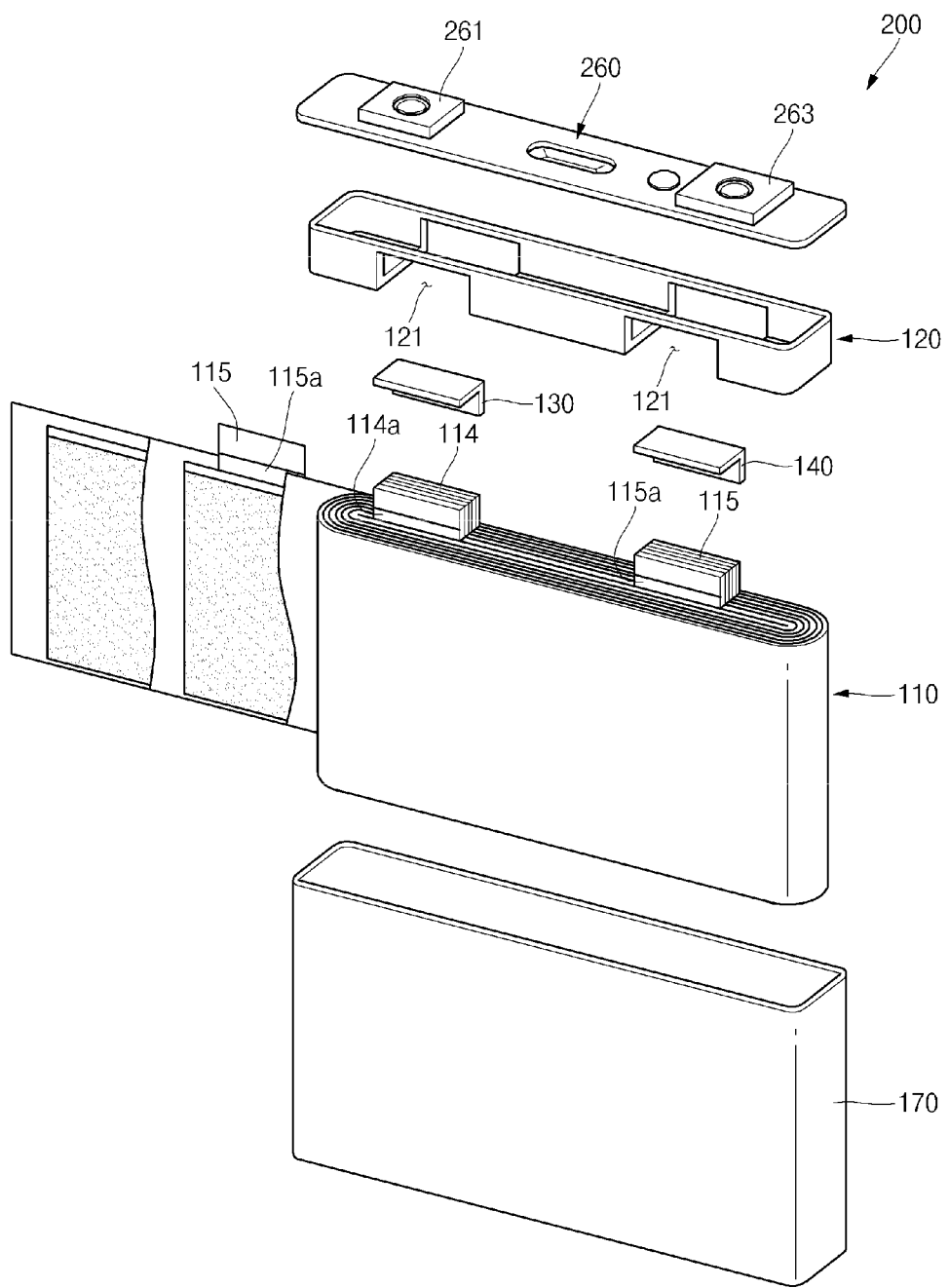

ELECTRODE ASSEMBLY AND BATTERY PACK HAVING THE SAME

CROSS-REFERENCE TO RELATED APPLICATION

This application claims priority to and the benefit of Korean Patent Application No. 10-2014-0161669 filed on 19 Nov. 2014 in the Korean Intellectual Property Office, the contents of which in its entirety are herein incorporated by reference.

BACKGROUND

1. Field

The present invention relates to an electrode assembly and a battery pack having the same.

2. Description of the Related Art

In general, secondary batteries can be discharged and recharged, unlike primary batteries, which are not rechargeable.

According to technological developments and increases in production of mobile devices such as mobile phones and notebook computers, demand for secondary batteries as an energy source has rapidly increased. Recently, research has been conducted into the use of secondary batteries as an alternative energy source for fossil fuels in electric vehicles or hybrid vehicles.

SUMMARY

The present invention provides an electrode assembly and a battery pack having the same, which includes a protection layer on at least one surface of each of a plurality of electrode tabs that can reinforce the strength of the corresponding electrode tab.

These and other objects of the present invention will be described in or be apparent from the following description of embodiments of the present invention.

In one or more embodiments of the present invention, an electrode assembly includes a first electrode plate having a plurality of first electrode tabs extending and protruding to one side, a second electrode plate having a plurality of second electrode tabs extending and protruding to one side, and a separator between the first electrode plate and the second electrode plate, wherein the first electrode plate further includes a first protection layer formed on a surface of each of the plurality of first electrode tabs.

The first protection layer may cover a first side of each of the plurality of first electrode tabs adjacent to the first electrode plate, while exposing a second side of each of the plurality of first electrode tabs to the outside, the first side opposite the second side.

Each of the plurality of first electrode tabs and the protection layer may have the same width and each of the plurality of first electrode tabs may have a length that is greater than the first protection layer.

The first electrode plate may include a first current collector plate that is substantially planar, a first coating that covers one surface of the first current collector plate, the plurality of first electrode tabs outwardly extending and protruding from one side of the first current collector plate, and the first protection layer covering a region adjacent to the first coating on one surface of each of the plurality of first electrode tabs.

The first protection layer may be in a region adjacent to each of the plurality of first electrode tabs on one surface of the first current collector plate.

The first protection layer may cover a region adjacent to the first coating on the other surface of each of the plurality of first electrode tabs.

The second electrode plate may include a second current collector plate that is substantially planar, a second coating covering one surface of the second current collector plate, the plurality of second electrode tabs outwardly extending and protruding from one side of the second current collector plate, and the second protection layer formed to entirely cover a region adjacent to the second current collector plate on one surface of each of the plurality of second electrode tabs.

The second protection layer may cover one side of the second current collector plate while exposing the other side of the second current collector plate to the outside, i.e., on one surface of each of the plurality of second electrode tabs.

The second protection layer may be on one side of the second current collector plate adjacent to each of the plurality of first electrode tabs.

The first protection layer and the second protection layer may include one of a lamination tape, a polymer coating and a binder.

According to another aspect of the present invention, there is provided a battery pack including the electrode assembly, a first electrode terminal electrically connected to a first electrode tab of the electrode assembly, a second electrode terminal electrically connected to a second electrode tab of the electrode assembly, a case accommodating the electrode assembly and having a top opening, and a cap plate sealing the top opening of the case and exposing the first electrode terminal and the second electrode terminal to the outside.

As described above, in the electrode assembly and the battery pack having the same according to the present invention, the strength of an electrode tab can be reinforced by a protection layer formed on at least one surface of each of a plurality of electrode tabs.

BRIEF DESCRIPTION OF THE DRAWINGS

The above and other features and aspects of the present invention will become more apparent by describing embodiments thereof with reference to the attached drawings in which:

FIG. 1A is a perspective elevation view of a battery according to one or more embodiments of the present invention;

FIG. 4C is an exploded perspective view illustrating the battery of FIGS. 4A and 4B.

DETAILED DESCRIPTION

Figure 1B:
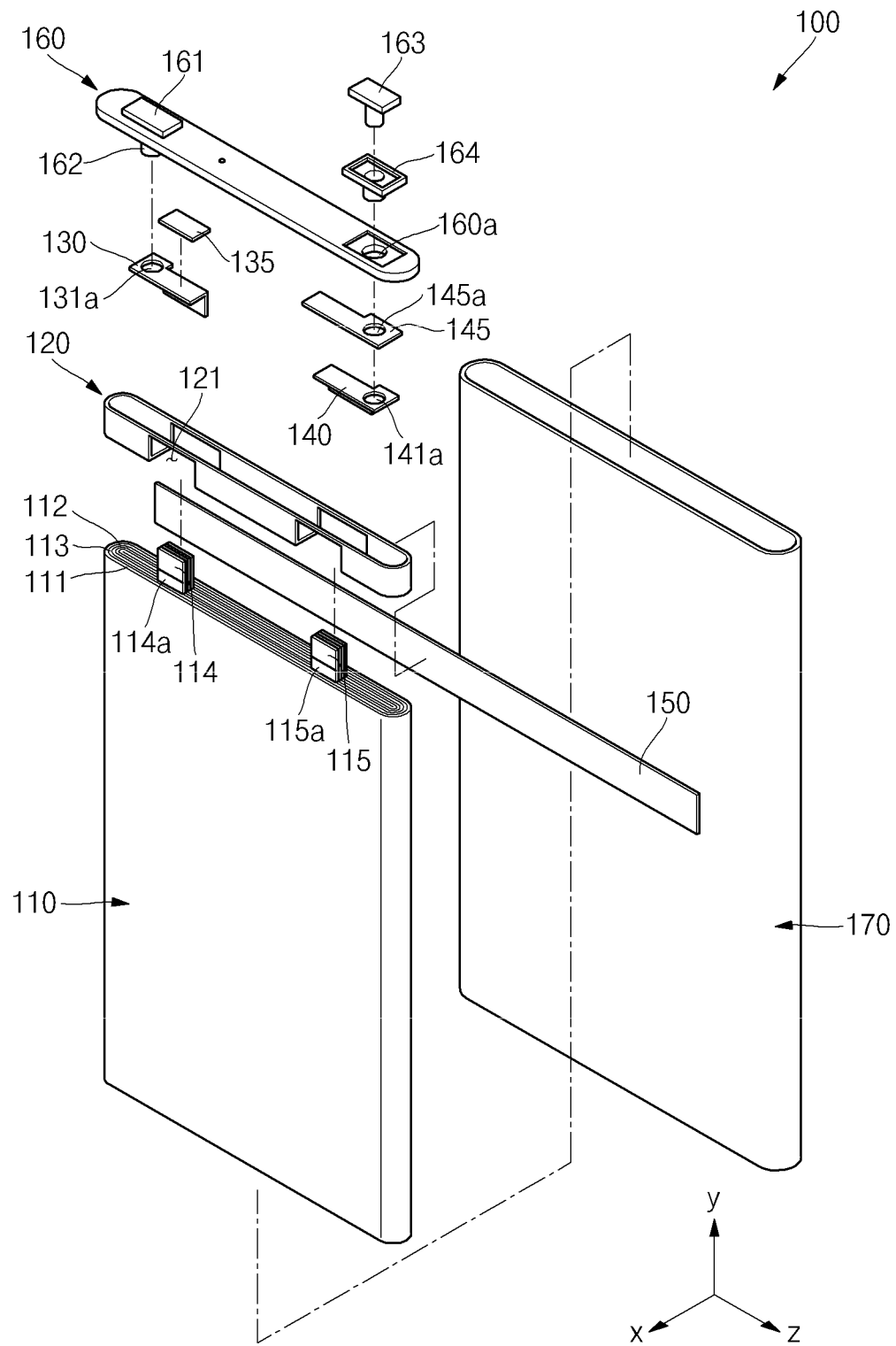
FIG. 1B is an exploded perspective view of the battery of FIG. 1A.

Hereinafter, embodiments of the present invention will be described with reference to the accompanying drawings. The present invention may, however, be embodied in many different forms and should not be construed as being limited to the embodiments set forth herein. Rather, these embodiments are provided so that this disclosure will be thorough and complete and will convey the concept of the invention to those skilled in the art.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer and/or part discussed below could be termed a second member, element, region, layer and/or part without departing from the teachings of the present invention.

As used herein, batteries may include, for example, rechargeable secondary batteries, such as lithium ion batteries, lithium polymer batteries or lithium ion polymer batteries, small-sized batteries designed for use in smart phones, cellular phones, notebook computers or digital cameras, and/or large-sized batteries designed for use in electric vehicles, hybrid vehicles, electric bicycles or electric motorcycles, but are not limited thereto.

Referring to FIGS. 1A and 1B, the battery 100 includes an electrode assembly 110, an insulation spacer 120 disposed on the electrode assembly 110, a case 170 accommodating the electrode assembly 110 and the insulation spacer 120 and a cap plate 160 corresponding to a top portion of the case 170.

The electrode assembly 110 includes a first electrode plate 111, a second electrode plate 112 and a separator 113. The electrode assembly 110 may be accommodated in the case 170 together with an electrolytic solution through the top opening of the case 170. The top opening of the case 170 may be sealed by the cap plate 160. Contact portions of the cap plate 160 and the case 170 may be coupled to each other by laser welding.

The electrode assembly 110 may be formed by winding a stacked structure of the first electrode plate 111, the separator 113, and the second electrode plate 112 in a jelly roll configuration or by sequentially laminating the stacked structure in a rectangular configuration. The first electrode plate 111, the separator 113, and the second electrode plate 112 may each be formed of thin plates or layers. In the electrode assembly 110, the first electrode plate 111 may function as a positive electrode and the second electrode plate 112 may function as a negative electrode, or vice versa.

Figure 2A:
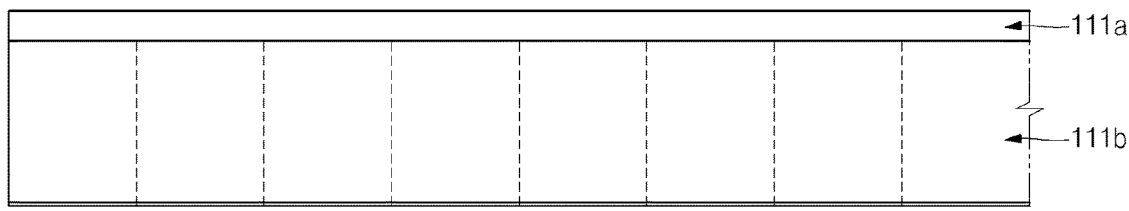
FIGS. 2A-2C are plan views sequentially illustrating one or more embodiments of a first electrode plate of an electrode assembly of FIG. 1B.
Figure 2B:
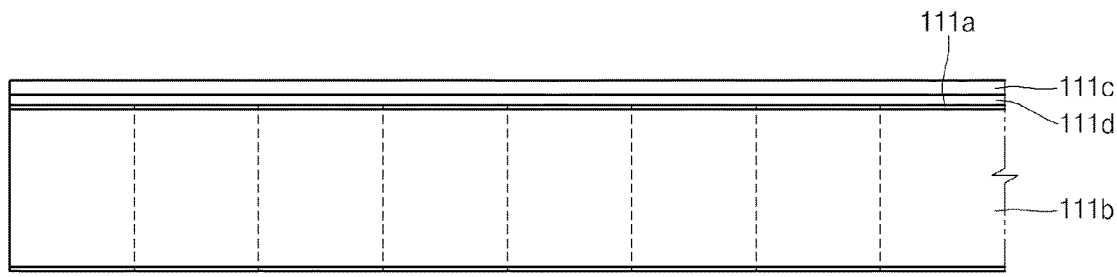
Figure 2C:
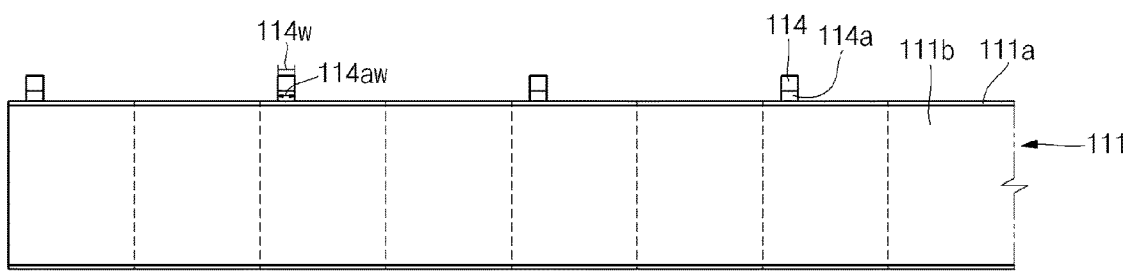

The first electrode plate 111 and the second electrode plate 112 may have the same configuration. The configuration and manufacturing method of the first electrode plate 111 is described herein with reference to FIGS. 2A to 2C. FIGS. 2A to 2C illustrate a first electrode plate 111 where the electrode assembly 110 is wound in a substantially jelly roll configuration.

The first electrode plate 111 may be prepared by coating a first coating 111$b$ as a first electrode active material, e.g., a transition oxide, on a surface of a first current collector plate 111$a$ (i.e., a first electrode collector) formed of a thin metal foil. The first coating 111$b$ may be formed on one surface or both surfaces of the first current collector plate 111$a$, but embodiments of the present invention are not limited thereto. In addition, the first electrode plate 111 may include a first electrode uncoated portion 111$c$ (see FIG. 2B) that is not coated with the first coating 111$b$ on a region adjacent to at least one side on one surface of the first current collector plate 111$a$.

The first electrode plate 111 may further include a first protection layer 111$d$ covering a region of the first electrode uncoated portion 111$c$ adjacent to the first coating 111$b$. A portion of the first electrode uncoated portion 111$c$ that is adjacent to the first coating 111$b$ may be covered by the first protection layer 111$d$ and a portion of the first electrode uncoated portion 111$c$ may be exposed to the outside. For example, the first electrode uncoated portion 111$c$ may have the first protection layer 111$d$ formed at its terminal region, which is then exposed to the outside. The first protection layer 111$d$ may be formed on at least one surface of the first electrode uncoated portion 111$c$ of the first electrode plate 111. The first protection layer 111$d$ may be made of a lamination tape, a polymer coating and/or a binder. When the first protection layer 111$d$ is made of a binder, the binder may be selected such that it does not demonstrate an adhesive property at a room temperature.

In the first electrode plate 111 having the first protection layer 111$d$, a portion of the first electrode uncoated portion 111$c$ may be removed by mechanical means, for example by punching, as shown between FIG. 2B (before punching) and FIG. 2C (after punching). For example, a region in the first electrode uncoated portion 111$c$ of the first electrode plate 111 that functions as a passage for current flowing between the first electrode plate 111 and an exterior of the first electrode plate 111 may be removed by punching. Here, portions of the first protection layer 111$d$ formed in the first electrode uncoated portion 111$c$ may also be removed. A portion of the region of the electrode uncoated portion 111$c$ and a portion of the region of the first protection layer 111$d$ may be tabs left after punching, forming a plurality of first electrode tabs 114.

For example, as shown in FIG. 2C, one or more portions of the first protection layer 111$d$ and the first electrode uncoated portion 111$c$ of the first electrode plate 111 may be simultaneously removed, leaving the first protection layer 114$a$ attached to a region corresponding to the first electrode tabs 114 and protruding to one side of the first electrode plate 111. In other words, the portions of the first protection layer 111$d$ that are not removed during punching form the first protection layer 114$a$ that corresponds to the first electrode tabs 114.

As described above, because the first electrode uncoated portion 111c and the first protection layer 111d of the first electrode plate 111 are simultaneously configured by punching, the first electrode tabs 114 having a width 114w and the first protection layer 114a having a width 114aw result therefrom.

Since the first electrode plate 111 includes the plurality of first electrode tabs 114, high output current can be obtained while reducing a resistance loss.

The first protection layer 114a is adhered to the plurality of first electrode tabs 114 extending from one side of the first electrode plate 111, thereby reinforcing the strength of each of the plurality of first electrode tabs 114, the plurality of first electrode tabs 114 having uncoated portions. The first protection layer 114a may be provided on at least one surface of each of the plurality of first electrode tabs 114.

Figure 3A:
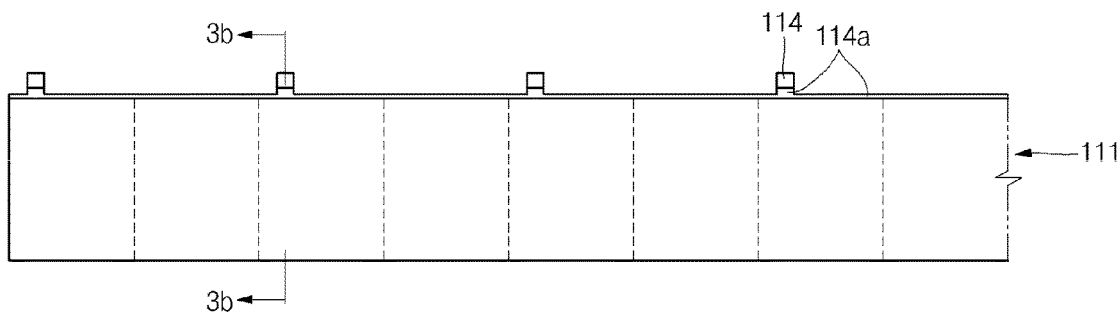
FIG. 3A is a plan view of another embodiment of a first electrode plate of an electrode assembly of FIG. 1B.
Figure 3B:
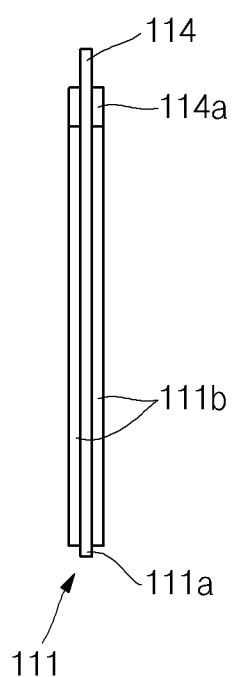
FIG. 3B is a cross-sectional view of the first electrode plate of FIG. 3A.

In addition, as shown in FIG. 3A, the first protection layer 114a may be formed to cover the first electrode tabs 114 and the first electrode uncoated portion 111c adjacent to the first coating 111b. For example, the first protection layer 114a may further be formed to cover a region of the first current collector plate 111a along one side adjacent to the first electrode tab 114. In addition, as shown in FIG. 3B, the first protection layer 114a may be formed on a first surface of the first electrode tab 114 and on a second surface of the first electrode tab 114 opposite the first surface. For example, the first protection layer 114a may be formed on both the first surface and the second surface of the first electrode tab 114 in the region adjacent to the first current collector plate 111a, thereby reinforcing the strength of the first electrode tab 114.

The second electrode plate 112 may be prepared by coating a second coating 115a as a second electrode active material, e.g., a transition oxide, on one surface of a second electrode collector plate formed of a thin metal foil. In addition, the second electrode plate 112 may include a plurality of second electrode tabs 115 extending and protruding from one side of the second electrode plate 112, the plurality of second electrode tabs 115 having uncoated portions. Since the second electrode plate 112 includes the second coating 115a on each of the plurality of second electrode tabs 115, the strength of the second electrode tabs 115 can be reinforced. The second protection layer 115a may be provided on at least one surface of each of the second electrode tabs 115.

The separator 113 may be positioned between the first electrode plate 111 and the second electrode plate 112 to prevent (or reduce) electrical short circuits and to allow movement of lithium ions. The separator 113 may include a material selected from the group consisting of polyethylene, polypropylene, or a composite film of polypropylene and polyethylene. However, embodiments of the present invention are not limited to the material of the separator 113 listed herein.

The first electrode tabs 114 of the electrode assembly 110 may be connected to the cap plate 160 and the second electrode tabs 115 may be connected to a second electrode terminal 163 located at a top surface of the cap plate 160. For example, a first electrode terminal 161 and the second electrode terminal 163 may be located at the top surface of the cap plate 160. The first electrode terminal 161 may be integrally formed as a protrusion from the cap plate 160 or as a separate member that couples with the top surface of the cap plate 160. The first electrode terminal 161 and the cap plate 160 may each have a positive polarity. The second electrode terminal 163 may be assembled to penetrate through the cap plate 160. The second electrode terminal 163 may establish an insulating bond with the cap plate 160 and may extend through the cap plate 160 to the top surface of the cap plate 160.

The first electrode tabs 114 and the second electrode tabs 115 are aligned in openings 121 of the insulation spacer 120 and coupled to the openings 121. The first electrode tabs 114 and the second electrode tabs 115 coupled to the insulation spacer 120 are respectively connected to the first lead 130 and the second lead 140 in (or at or within) the insulation spacer 120.

Before the first electrode tabs 114 are aligned in the openings 121, the plurality of first electrode tabs 114 may be bundled by provisionally welding. The bundled first electrode tabs 114 are easily aligned and fitted into the openings 121 for assembly. Similarly, before the second electrode tabs 115 are aligned in the openings 121 of the insulation spacer 120, the plurality of second electrode tabs 115 may be bundled by provisionally welding.

The first electrode tabs 114 are aligned in the corresponding openings 121 of the insulation spacer 120 and positioned in the insulation spacer 120 or exposed to the outside of the insulation spacer 120 through the openings 121. The exposed first electrode tabs 114 are fitted with the first lead 130, which is then fitted with the cap plate 160. Accordingly, the first electrode tabs 114 of the electrode assembly 110 are electrically connected to the cap plate 160 through the first lead 130. The cap plate 160 may generally have a positive polarity, like the first electrode tabs 114 and a portion of the cap plate 160 may protrude from the cap plate 160 to form the first electrode terminal 161.

The second electrode tabs 115 are also aligned in the corresponding openings 121 of the insulation spacer 120 and positioned in the insulation spacer 120 or exposed to the outside of the insulation spacer 120 through the openings 121. The exposed second electrode tabs 115 are connected to the second lead 140, which is coupled to the second electrode terminal 163. Accordingly, the second electrode tabs 115 of the electrode assembly 110 are electrically connected to the second electrode terminal 163 through the second lead 140.

The second electrode terminal 163 and the cap plate 160 are assembled with an insulation gasket 164 interposed therebetween. A terminal hole 160a is formed in the cap plate 160 to allow the second electrode terminal 163 to pass therethrough. The second electrode terminal 163 is fitted into the terminal hole 160a of the cap plate 160 with the insulation gasket 164 interposed between the second electrode terminal 163 and the cap plate 160 to electrically insulate the second electrode terminal 163 from the cap plate 160. The insulation gasket 164 seals the peripheral portion of the terminal hole 160a, thereby preventing the electrolytic solution contained in the case 170 from leaking and performing a sealing function that prevents (or substantially limits) external foreign matter from penetrating into the case 170.

An insulation plate 145 for electrically insulating the second lead 140 and the cap plate 160 from each other may be interposed between the second lead 140 and the cap plate 160. The insulation plate 145 may electrically insulate the second lead 140 and the cap plate 160 from each other along with the insulation gasket 164. In addition, terminal holes 141a and 145a may be provided in the second lead 140 and the insulation plate 145, respectively, to be coupled to the second electrode terminal 163.

The second electrode terminal 163 is assembled with the cap plate 160, the insulation plate 145, and the second lead 140 by passing through the terminal holes 160a, 145a and 141a, and a lower portion of the second electrode terminal 163 is compressed to a bottom surface of the second lead 140, thereby coupling the cap plate 160, the insulation plate 145, and the second lead 140 in a position-aligned manner.

For example, the cap plate 160, the insulation plate 145 and the second lead 140 may be stacked on top of one another, the second electrode terminal 163 may then be fitted into the terminal holes 160a, 145a and 141a from a top portion of the cap plate 160, and a riveting or spinning process may be performed on a bottom portion of the second electrode terminal 163 exposed to the bottom surface of the second lead 140, thereby compressing the second electrode terminal 163 with the bottom surface of the second lead 140.

The insulation spacer 120 is interposed between the electrode assembly 110 and the cap plate 160. The insulation spacer 120 may include an insulating material that does not react with the electrolytic solution, including one or more selected from the group consisting of, for example, polypropylene (PP), polyethylene (PE), ethylene propylene diene monomer (EPDM) and equivalents thereof, but the insulation spacer 120 is not limited thereto. The insulation spacer 120 may function to prevent electrical interference or electrical short circuits between the electrode assembly 110 and the cap plate 160. In addition, the insulation spacer 120 may serve to align and position the plurality of electrode tabs 114 and 115 extending from the electrode assembly 110 at proper regions, thereby facilitating electrical connections between the plurality of electrode tabs 114 and 115 and the first and second leads 130 and 140.

For example, the plurality of first and second electrode tabs 114 and 115 that upwardly protrude (or extend) from the electrode assembly 110 may be aligned in the openings 121 of the insulation spacer 120 to be coupled thereto, and the bundles of the aligned and coupled first and second electrode tabs 114 and 115 may be electrically connected to the first and second leads 130 and 140, respectively, by, for example, welding.

The insulation spacer 120 provides a proper space between the electrode assembly 110 and the cap plate 160, thereby insulating the plurality of electrode tabs 114 and 115 even upon exposure to external impacts, such as high-frequency vibration or drop impact.

In addition, the openings 121 of the insulation spacer 120 are used as welding spaces for permitting welding between the plurality of electrode tabs 114 and 115 and the first and second leads 130 and 140. For example, the openings 121 may be formed at welding positions or assembling positions between the plurality of electrode tabs 114 and 115 and the first and second leads 130 and 140. Electrical resistance welding, laser welding or ultrasonic welding can easily be performed between the plurality of electrode tabs 114 and 115 and the first and second leads 130 and 140.

The battery pack 100 further includes an insulation member 150 that surrounds the insulation spacer 120, which may prevent the openings 121 from being exposed to the outside. Accordingly, the insulating properties can be further secured between the plurality of electrode tabs 114 and 115 and the first and second leads 130 and 140. In addition, the insulation member 150 surrounds not only the insulation spacer 120 but also an upper region of the electrode assembly 110, thereby mechanically coupling the insulation spacer 120 and the electrode assembly 110 to each other.

Figure 4A:
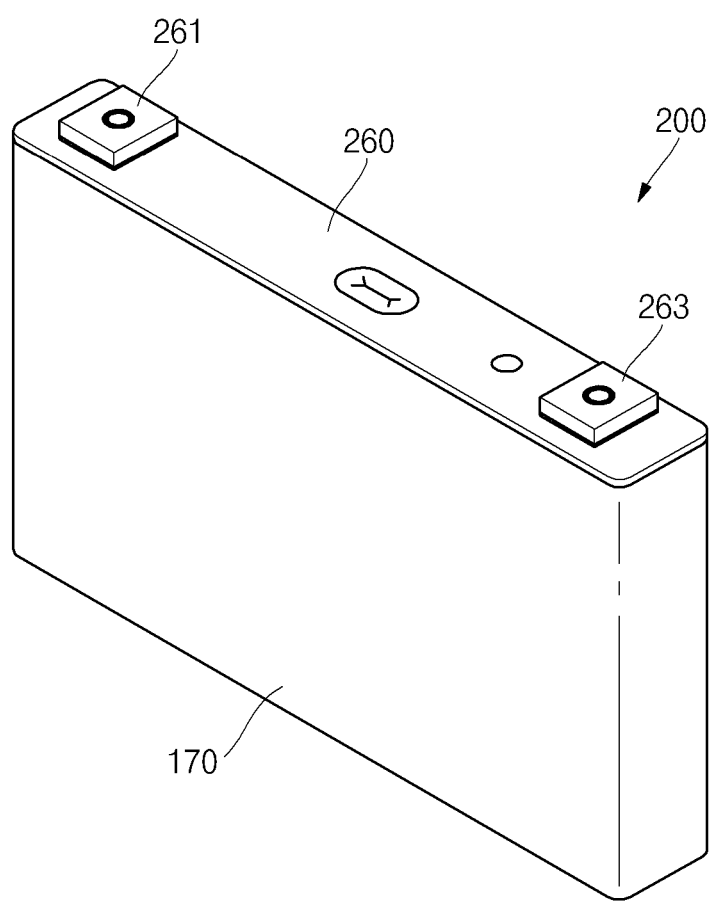
FIG. 4A is a perspective elevation view of a battery according to one or more embodiments of the present invention.
Figure 4B:
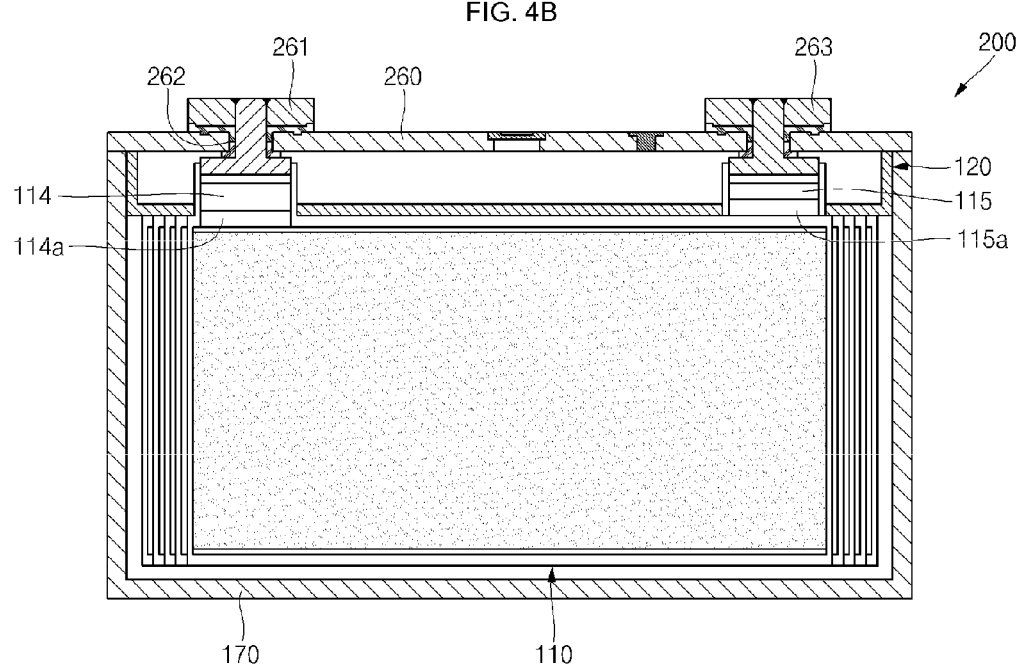
FIG. 4B is a cross-sectional elevation view of the battery of FIG. 4A

A battery 200 shown in FIGS. 4A to 4C is generally designed for use in an electric vehicle or a hybrid vehicle. A basic configuration of the battery 200 shown in FIGS. 4A to 4C is substantially the same with that of the battery 100 shown in FIGS. 1A and 1B, and the following description focuses on differences between the batteries 100 and 200.

As shown in FIGS. 4A to 4C, an insulation spacer 120 is positioned between a cap plate 260 and an electrode assembly 110 and includes openings 121 having open bottom and lateral regions. In addition, a plurality of electrode tabs 114 and 115 extending from the electrode assembly 110 are coupled through the openings 121 to leads 130 and 140, respectively and connected to electrode terminals 261 and 263, respectively. The plurality of electrode tabs 114 and 115 and the leads 130 and 140 are respectively welded to each other within the openings 121.

In one embodiment of the battery 200 for use in an electric vehicle, neither the cap 260 nor a case 170 of the battery 200 have a polarity which thereby improves safety (and minimizes the risk of harm) in the event of puncture or collapse of the battery 200. Accordingly, the first electrode terminal 261 and the second electrode terminal 263 may each be electrically insulated from the cap plate 260. Thus, the first electrode terminal 261 may be electrically insulated from the cap plate 260 by an insulation gasket 262.

While the electrode assembly and the battery pack having the same according to the present invention have been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. An electrode assembly comprising:
   a first electrode plate comprising:
      a first current collector plate having a substantially planar shape;
      a first coating covering a first portion of a first surface of the first current collector plate; and
      a plurality of first electrode tabs extending and protruding from the first electrode plate, the plurality of first electrode tabs extending in parallel with each other;
   a second electrode plate comprising:
      a second current collector plate having a substantially planar shape;
      a second coating covering a first portion of a first surface of the second current collector plate; and
      a plurality of second electrode tabs extending and protruding from the second electrode plate; and
   a separator between the first electrode plate and the second electrode plate,
   wherein the first electrode plate, the second electrode plate, and the separator are wound together,
   wherein the first electrode plate further comprises a first protection layer on a surface of each of the plurality of first electrode tabs and that covers a second portion of the first surface of the first current collector plate between the first portion and the plurality of first electrode tabs, and
   wherein the second electrode plate further comprises a second protection layer on a surface of each of the plurality of second electrode tabs and that covers a second portion of the first surface of the second current collector plate between the first portion and the plurality of second electrode tabs.

2. The electrode assembly of claim 1, wherein the first protection layer covers a first side of each of the plurality of first electrode tabs adjacent to the first electrode plate and exposes a second side of each of the plurality of first electrode tabs to the outside on one surface of each of the plurality of first electrode tabs, wherein the first side is opposite the second side.

3. The electrode assembly of claim 1, wherein each of the plurality of first electrode tabs and the first protection layer have the same width and each of the plurality of first electrode tabs has a length that is greater than a length of the first protection layer.

4. The electrode assembly of claim 1,
wherein the plurality of first electrode tabs outwardly extend and protrude from one side of the first current collector plate, and
wherein the first protection layer entirely covers a region adjacent to the first coating on a first surface of each of the plurality of first electrode tabs.

5. The electrode assembly of claim 4, wherein the first protection layer is formed in a region adjacent to each of the plurality of first electrode tabs on one surface of the first current collector plate.

6. The electrode assembly of claim 4, wherein the first coating further covers a first portion of a second surface of the first current collector plate, the second surface of the first current collector plate being opposite to the first surface of the first current collector plate, and
wherein the first protection layer entirely covers a region adjacent to the first coating on a second surface of each of the plurality of first electrode tabs, the second surface of each of the plurality of first electrode tabs being opposite to the first surface of each of the plurality of first electrode tabs.

7. The electrode assembly of claim 4,
wherein the plurality of second electrode tabs outwardly extend and protrude from one side of the second current collector plate; and
wherein the second protection layer entirely covers a region adjacent to the second current collector plate on one surface of each of the plurality of second electrode tabs.

8. The electrode assembly of claim 7, wherein the second protection layer covers a first side of the second current collector plate while exposing a second side opposite to the first side of the second current collector plate to the outside, on a first surface of each of the plurality of second electrode tabs.

9. The electrode assembly of claim 7, wherein the second protection layer is on a side of the second current collector plate adjacent to each of the plurality of first electrode tabs.

10. The electrode assembly of claim 1, wherein the first protection layer and the second protection layer comprise one of a lamination tape, a polymer coating and a binder.

11. A battery pack comprising:
an electrode assembly comprising:
a first electrode plate comprising:
a first current collector plate having a substantially planar shape;
a first coating covering a first portion of a first surface of the first current collector plate; and
a plurality of first electrode tabs extending and protruding from the first electrode plate, the plurality of first electrode tabs extending in parallel with each other;
a second electrode plate comprising:
a second current collector plate having a substantially planar shape;
a second coating covering a first portion of a first surface of the second current collector plate; and
a plurality of second electrode tabs extending and protruding from the second electrode plate; and
a separator between the first electrode plate and the second electrode plate,
wherein the first electrode plate, the second electrode plate, and the separator are wound together,
wherein the first electrode plate further comprises a first protection layer on a surface of each of the plurality of first electrode tabs and on a second portion of the first surface of the first current collector plate between the first portion and the plurality of first electrode tabs, and
wherein the second electrode plate further comprises a second protection layer on a surface of each of the plurality of second electrode tabs and that covers a second portion of the first surface of the second current collector plate between the first portion and the plurality of second electrode tabs;
a first electrode terminal electrically connected to the plurality of first electrode tabs of the electrode assembly;
a second electrode terminal electrically connected to the plurality of second electrode tabs of the electrode assembly;
a case accommodating the electrode assembly and having a top opening;
a cap plate sealing the top opening of the case and exposing the first electrode terminal and the second electrode terminal to the outside of the cap plate; and
an insulation spacer between the cap plate and the electrode assembly,
wherein the insulation spacer defines a first opening, and
wherein the plurality of first electrode tabs are coupled to the insulation spacer at the first opening.

12. The electrode assembly of claim 1, wherein the second portion of the first surface of the first current collector plate has a length that is equal to a length of the first current collector plate in its entirety.

13. The battery pack of claim 1, wherein the plurality of first electrode tabs are welded to each other.

* * * * *